United States Patent Office 3,093,174
Patented June 11, 1963

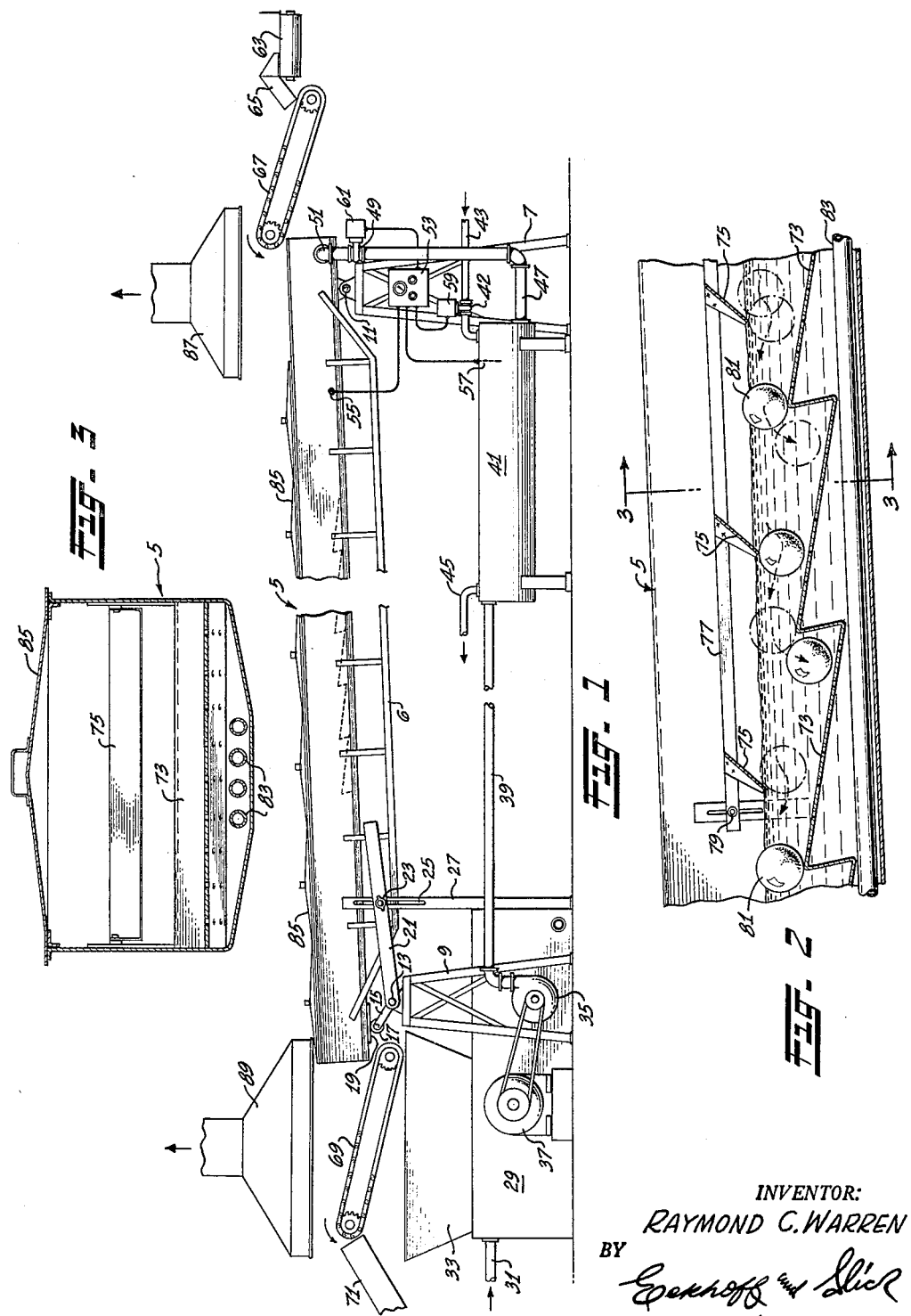

3,093,174
TOMATO PEELER
Raymond C. Warren, Woodland, Calif., assignor to Contadina Foods, Inc., a corporation of Illinois
Filed Apr. 26, 1961, Ser. No. 105,803
2 Claims. (Cl. 146—47)

This invention relates to a tomato treating machine and more particularly relates to a machine for subjecting tomatoes or similar fruit having a soft, delicate skin to the action of a hot lye solution.

It is known that tomatoes can be skinned by first immersing them in a hot lye bath which serves to loosen the skin making it possible for the skin to be removed readily in a subsequent operation. In treating the tomatoes with a hot caustic solution it is important that the tomatoes be gently handled since, although the tomato has a relatively tough skin, the flesh of the tomato is soft and perishable so that the tomato cannot be subjected to any harsh treatment mechanically without injuring the flesh and making the tomato less desirable. On the other hand, the tomato must be subjected to a certain amount of agitation while in the treating bath to make sure that fresh hot solution is brought into contact with all parts of the fruit. Additionally, tomatoes tend to float in a caustic bath so it is necessary that some means be employed to push the tomatoes under the solution and to prevent the tomatoes from merely floating through the bath in such a manner that the top portion of the tomato is not brought into intimate contact with the hot lye solution. Another problem in processing tomatoes is that the degree of treatment depends on the variety of tomato, its size and its degree of ripeness. Thus it is highly desirable that any tomato treating machine be easily adjustable so that it can subject any given lot of tomatoes to exactly the required degree of treatment.

In accordance with the present invention, a tomato treating machine is provided in the form of an inclined trough. The trough has a first series of step-like baffles therein near the bottom of the trough so that as the tomatoes pass down the trough they are given a rolling or bouncing motion by contact with the baffle. Further, a plurality of hold-down deflectors are provided near the top surface of the treating solution whereby the tomatoes are periodically pushed under the surface of the treating solution. The hold-down deflectors are staggered with respect to the upwardly projecting points of the step-like baffles. The hot caustic solution flows concurrently with the tomatoes down the incline trough and by adjusting the angle of the trough as well as the amount of caustic solution which is pumped through the trough the treatment can be varied to suit any given lot of tomatoes.

In the drawings forming part of this application:

FIGURE 1 is a side view of a treating machine embodying the present invention.

FIGURE 2 is an enlarged cut away view of the central portion of the treating trough.

FIGURE 3 is a section on the line 3—3 of FIGURE 2, showing a cover in position.

Referring now to the drawings by reference characters, the machine comprises a treating trough generally designated 5 having a reinforcing truss 6. The trough 5 is supported at its high end by a framework member 7 and at its lower end by a second framework member 9. The high end of the trough is pivoted as at 11 to the framework member 7. At the lower end of the trough the framework member 9 provides pivotal support for a transverse shaft 13 to which a pair of lever arms 15 are affixed as by welding. Each arm 15 has a roller 17 mounted at its terminal end for smooth contact with a reinforcing plate 19 which is attached to the bottom surface of trough 5. An operating lever arm 21 is rigidly mounted on one end of shaft 13 to provide a means for rotating arms 15. The lever arm 21 is fastened in the desired attitude after adjustment by means of a bolt and nut assembly 23 which passes through a slot 25 on a vertical frame member 27. Thus, movement of lever arm 21 tends to raise or lower the discharge end of the trough and the trough may be fixed in any desired position by means of bolt and nut 23.

Adjacent the lower end of the treating trough is a lye tank 29 having a makeup line 31. The top of the lye tank 29 is partially open, the open portion having a hopper 33 thereover so that liquid coming from the trough, as is hereinafter more fully explained, will be caught in the hopper 33 and returned to the tank 29. At one side of the tank 29 a pump 35 driven by a prime mover 37 is provided drawing lye solution from the tank 29 and passing it through the line 39 to a heat exchanger 41. The heat exchanger 41 has a steam inlet 43 with a valve 42 and an outlet 45. The heat exchanger 41 also has a lye outlet 47 which leads through the valve 49 into a discharge elbow 51 whereupon the lye solution is discharged into the treating tank 5. Thus, the lye solution is continuously and controllably circulated through the treating trough 5, the tank 29, and heat exchanger 41 while makeup lye solution can be added through the line 31. A controller 53 is provided for controlling the temperature of the lye solution as well as its rate of flow through the treating trough. The controller 53 has a temperature sensing element 55 located in the trough 5 and a second temperature sensing element 57 located in the heat exchanger 41. Controller 53 also has lines leading to a valve position control 59 which actuates the steam inlet valve 42 and a second valve position control 61 which actuates the lye inlet valve 49. Thus the controller 53 regulates both the lye treating temperature and the rate of flow of the lye solution through the treating trough.

Tomatoes are delivered to the machine from a supply conveyor 63 whereupon they pass through the chute 65 and onto the endless belt 67 which deposits them in the upper end of the treating trough. After the tomatoes have passed through the trough, they are discharged onto the endless belt 69. The belt 69 is of a mesh character so that the tomatoes are well drained of the lye solution by the time they are discharged into the chute 71. As has been previously described, the lye solution which drains from tomatoes on the belt 69 as well as the lye solution which is discharged directly from the trough 5, is caught in the hopper 33 and returned to the tank 29 for recirculation.

The treating trough itself has a plurality of zigzag baffles 73 preferably made of perforated metal in its bottom. Further, a series of cross deflectors 75 are supported above the normal surface of the treating solution and extend slightly into the treating solution. The upper deflectors 75 are carried on arms 77 which can be adjusted as is shown by the mechanism 79 to secure more or less immersing action. It will be noted that the baffles 73 comprise a series of step-like elements which are in offset relationship with the deflectors 75. Thus, as tomatoes 81 pass down through the tank they are temporarily lifted above their normal floating position by the upper end of each inclined step and with continued movement tend to plunge deeply into the lye solution. Alternately, between these tumbling movements, the tomatoes are nudged downwardly into the solution by the deflectors 75 and as a consequence pass through the tank with a constant tumbling and bobbing motion, as indicated by the arrows in FIGURE 3.

Although it is ordinarily not necessary to supply any additional heat to the caustic solution since it is circulated rapidly through the treating trough, if desired, a plurality of pipes 83 can be provided in the bottom of the trough for supplying additional heat to the lye solution.

To prevent undesirable fumes from arising from the tomato treater, the central portion of the trough 5 is provided with a plurality of removable covers 85. Further, the inlet and discharge ends of the treating trough are provided with fume hoods 87 and 89.

It is believed apparent from the foregoing that I have provided an efficient caustic treating machine for tomatoes or like fruit wherein the tomatoes are gently handled yet are thoroughly subjected to the action of the hot caustic solution and wherein said machine is readily adjustable so that the degree of treatment can be varied.

I claim:

1. A machine for treating tomatoes and the like with a hot caustic solution comprising:
    (a) an inclined trough having a relatively elevated feed end and a relatively lowered discharge end and having a fixed bottom incorporating a series of step-like baffles secured thereto, each of said baffles having a relatively elongated, substantially horizontal portion and a relatively shorter riser element, said riser element being substantially the length of the diameter of the said tomatoes to be treated; and
    (b) means for circulating a hot caustic solution down said trough from the feed end to the discharge end thereof and for recycling said hot caustic solution from the said discharge end to the said feed end, said means having a capacity for caustic adequate to maintain the entirety of said series of baffles completely submerged at all times while the upper surface of the said caustic in the said trough is substantially in a single plane.

2. The structure of claim 1 wherein a series of deflectors are mounted above said trough at points spaced therealong, said deflectors being positioned between riser elements of the said baffle, said deflectors extending to a level about that normally reached by the upper surface of the said caustic.

References Cited in the file of this patent

UNITED STATES PATENTS

| | | |
|---|---|---|
| 565,151 | Barlow-Massicks | Aug. 4, 1896 |
| 849,650 | Anderson | Apr. 9, 1907 |
| 1,117,644 | Donaldson | Nov. 17, 1914 |
| 2,136,118 | Palmer | Nov. 8, 1938 |
| 2,391,630 | Kibler | Dec. 25, 1945 |